(12) United States Patent
Beck et al.

(10) Patent No.: US 8,618,439 B2
(45) Date of Patent: Dec. 31, 2013

(54) METHOD FOR PRODUCING A HOLE

(75) Inventors: Thomas Beck, Panketal (DE);
Nigel-Philip Cox, Mülheim an der Ruhr (DE); Silke Settegast, Berlin (DE)

(73) Assignee: Siemens Aktiengesellschaft, München (DE)

( * ) Notice: Subject to any disclaimer, the term of this patent is extended or adjusted under 35 U.S.C. 154(b) by 130 days.

(21) Appl. No.: 13/397,057

(22) Filed: Feb. 15, 2012

(65) Prior Publication Data
US 2012/0145678 A1    Jun. 14, 2012

Related U.S. Application Data

(63) Continuation of application No. 12/087,720, filed as application No. PCT/EP2006/070280 on Dec. 29, 2006, now Pat. No. 8,153,923.

(30) Foreign Application Priority Data

Jan. 10, 2006  (EP) .................................... 06000406

(51) Int. Cl.
*B23K 26/38* (2006.01)
*B23K 15/08* (2006.01)

(52) U.S. Cl.
USPC .............. 219/121.71; 219/121.2; 219/121.35; 219/121.61

(58) Field of Classification Search
USPC ............ 219/121.61, 121.67–121.72, 121.81, 219/121.85
See application file for complete search history.

(56) References Cited

U.S. PATENT DOCUMENTS 5,939,010 A * 8/1999 Yuyama et al. ................ 264/400
6,555,782 B2 * 4/2003 Isaji et al. ................ 219/121.72

* cited by examiner

*Primary Examiner* — Samuel M Heinrich

(57) ABSTRACT

There are a multiplicity of methods of making through-holes. In particular in the production of a multiplicity of film-cooling holes, as in gas turbine blades or combustion chamber elements, small time advantages are also important when making a hole. The method according to the invention, to make the hole close to the final contour in each case in sections in a top and a bottom region in order to then produce the final contour with other laser parameters, achieves time advantages.

20 Claims, 6 Drawing Sheets

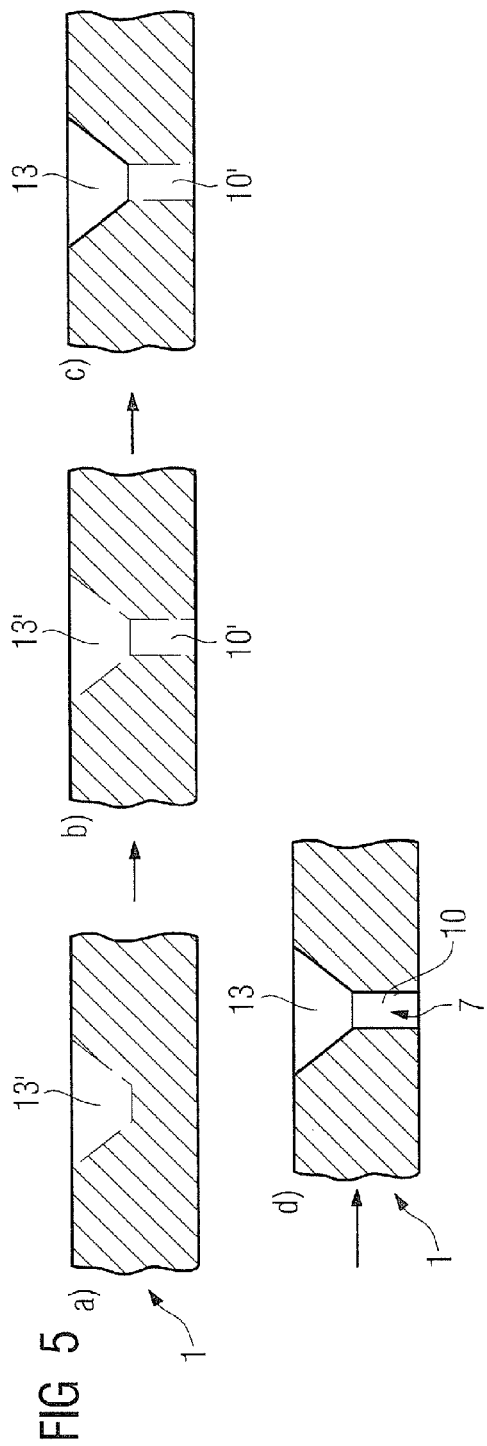
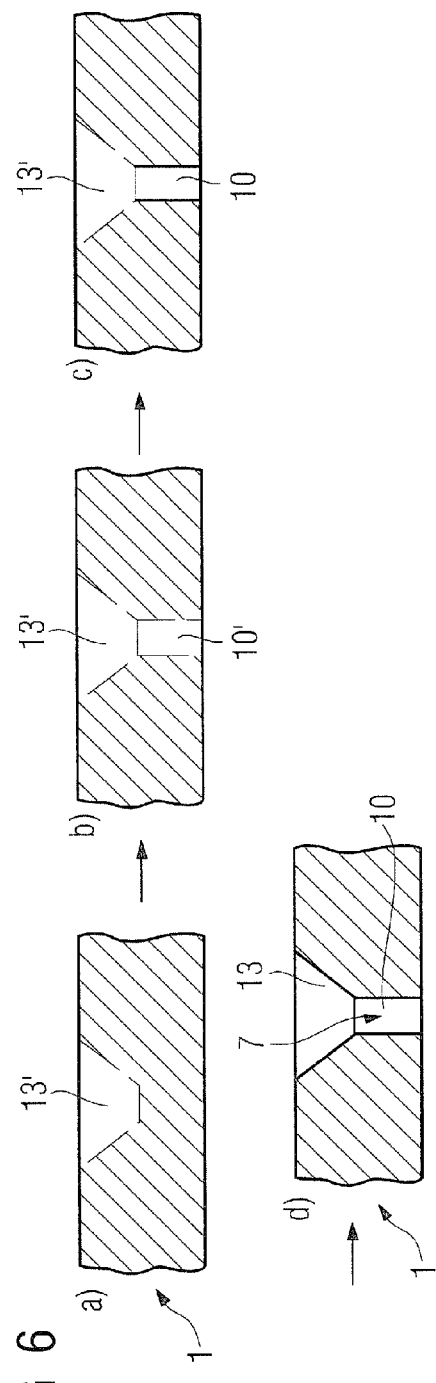

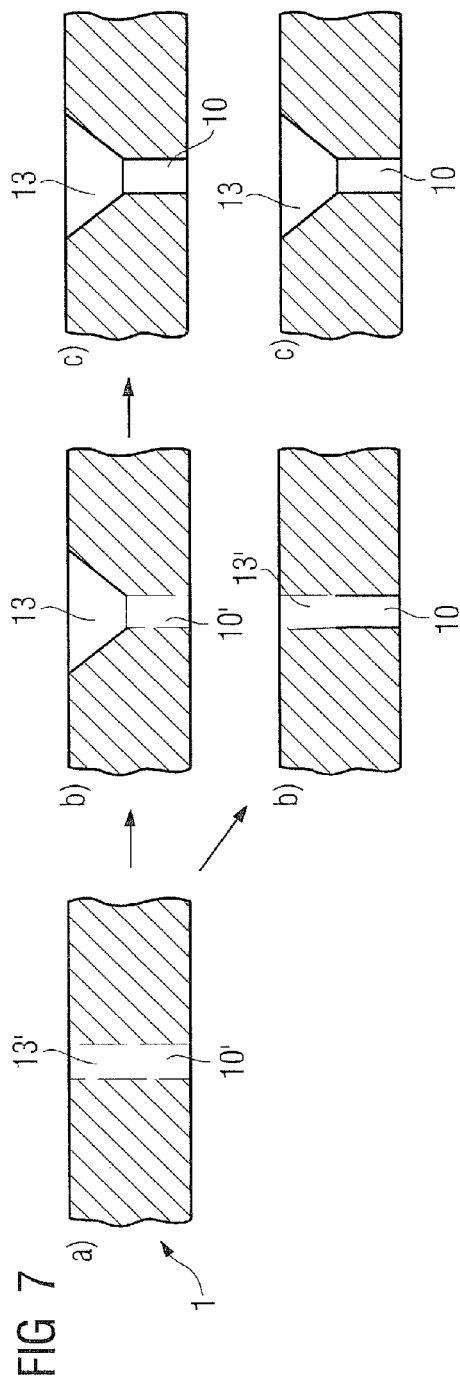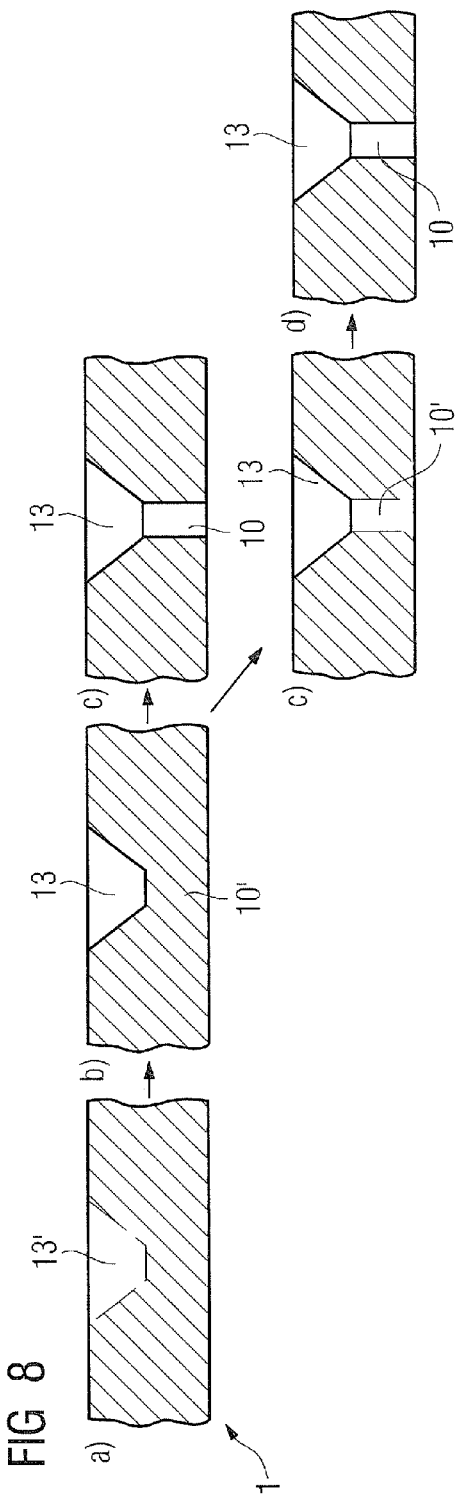

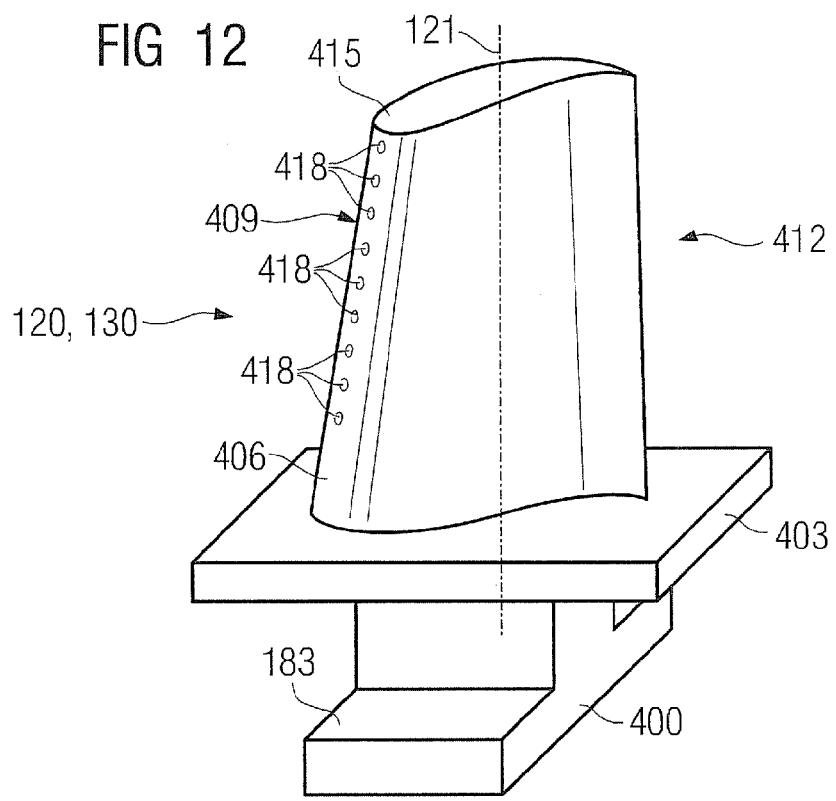
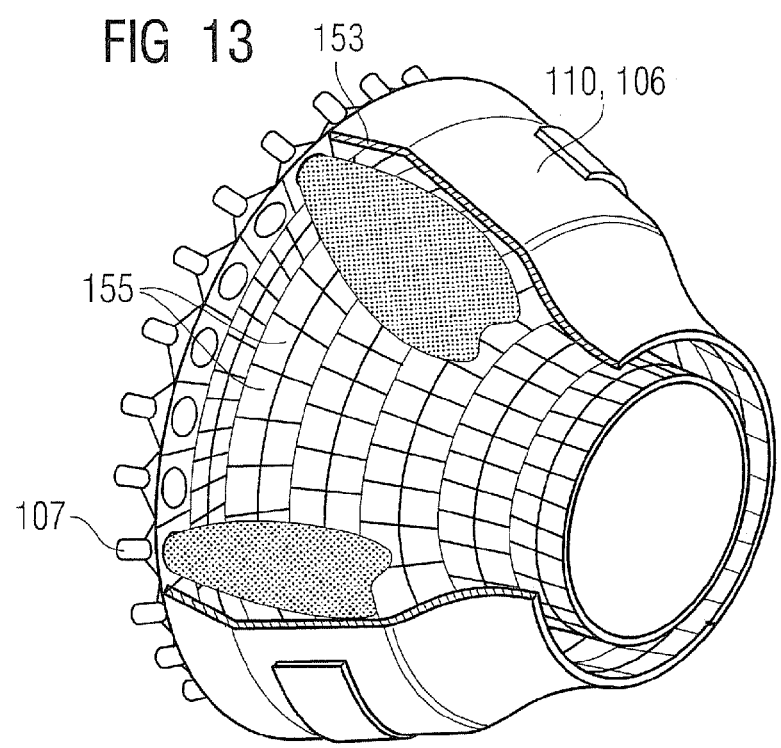

METHOD FOR PRODUCING A HOLE

CROSS REFERENCE TO RELATED APPLICATIONS

This application is a continuation of application Ser. No. 12/087,720 filed Jul. 10, 2008, now U.S. Pat. No. 8,153,923 which is the US National Stage of International Application No. PCT/EP2006/070280, filed Dec. 29, 2006 and claims the benefit thereof. The International Application claims the benefits of European application No. 06000406.6 filed Jan. 10, 2006, both of the applications are incorporated by reference herein in their entirety.

FIELD OF INVENTION

The invention relates to a method for producing a hole as claimed in the claims.

BACKGROUND OF THE INVENTION

For many components, castings in particular, material removal subsequently needs to be carried out for instance to four indentations or through-holes need. Particularly for turbine components which have film cooling holes for cooling, holes are subsequently introduced after production of the component.

Such turbine components often also have layers, for example a metallic layer or interlayer and/or a ceramic outer layer. The film cooling holes must then be produced through the layers and the substrate (casting).

U.S. Pat. Nos. 6,172,331 and 6,054,673 disclose a laser boring method for introducing holes into layer systems, ultrashort laser pulse lengths being used. A laser pulse length is found from a particular laser pulse length range and the hole is thereby produced.

DE 100 63 309 A1 discloses a method for producing a cooling air opening by means of the laser, in which the laser parameters are adjusted so that material is ablated by sublimation.

U.S. Pat. No. 5,939,010 discloses two alternative methods for producing a multiplicity of holes. In one method (FIGS. 1, 2 of the US patent) one hole is initially produced fully before the next hole is produced. In the second method, the holes are produced stepwise, by first producing a first subregion of a first hole then a first subregion of a second hole etc. (FIG. 10 of the US patent). Different pulse lengths may be used in the two methods, but the pulse length used in a given method is always the same. The two methods cannot be interlinked.

The cross-sectional area of the region to be ablated always corresponds to the cross section of the hole to be produced.

U.S. Pat. No. 5,073,687 discloses the use of a laser for producing a hole in a component, which is formed by a substrate with a copper layer on both sides. Initially a hole is produced through the copper film by means of a longer pulse duration, and then a hole is produced by means of shorter pulses in the substrate consisting of a resin, a hole subsequently being produced through a copper layer on the rear side with a higher output power of the laser. The cross-sectional area of the region to be ablated corresponds to the cross section of the hole to be produced.

U.S. Pat. No. 6,479,788 B1 discloses a method for producing a hole, in which longer pulses are used in a first step than in a further step. The pulse duration is varied here in order to produce an optimal rectangular shape in the hole. The cross-sectional area of the beam is also increased as the pulse length decreases.

Another laser boring method is disclosed in EP 1 062 070 B1.

The use of such ultrashort laser pulses is expensive and very time-intensive owing to their low average powers.

SUMMARY OF INVENTION

It is therefore an object of the invention to overcome this problem.

The object is achieved by a method as claimed in the claims.

Further advantageous measures of the method are listed in the dependent claims of the method.

The measures listed in the dependent claims may advantageously be combined with one another in any desired way.

More rapid production of the hole in a component is made possible by the subdivision of a hole during production into a lower region and an outer diffusor, and the division between producing the lower region and the diffusor close to final contour and with the final contour.

BRIEF DESCRIPTION OF THE DRAWINGS

The invention will be explained in more detail with the aid of the figures, in which:
FIGS. 4-9 show ablation steps of methods according to the invention,
FIG. 12 shows a perspective view of a turbine blade and
FIG. 13 shows a perspective view of a combustion chamber.

DETAILED DESCRIPTION OF INVENTION

Figure 1:
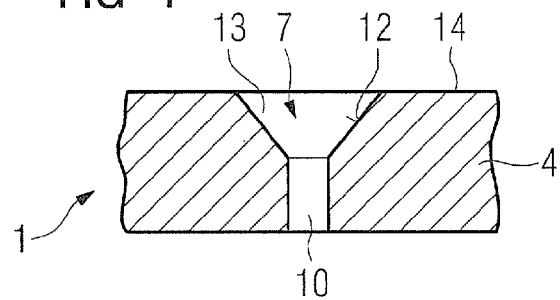
FIG. 1 shows a hole in a substrate.

Description of the Component with a Hole
FIG. 1 shows a component 1 with a hole 7. The component 1 consists of a substrate 4 (for example a casting or DS or SX component).

The substrate 4 may be metallic and/or ceramic. Particularly in the case of turbine components, for example turbine rotor blades 120 or guide vanes 130 (FIGS. 11, 12), heat shield elements 155 (FIG. 13) and other housing parts of a steam or gas turbine 100 (FIG. 11), but also an aircraft turbine, the substrate 4 consists of a nickel-, cobalt- or iron-based superalloy. In the case of turbine blades for aircraft, the substrate 4 consists for example of titanium or a titanium-based alloy.

The substrate 4 comprises a hole 7, which is for example a through-hole. It may however also be a blind hole. The hole 7 consists of a lower region 10 which starts from an inner side of the component 1 and is for example designed symmetrically (for example circularly, ovally or rectangularly), and an upper region 13 which is optionally designed as a diffusor 13 on an outer surface 14 of the substrate 4. The diffusor 13 represents a widening of the cross section relative to the lower region 10 of the hole 7.

The hole 7 is for example a film cooling hole. In particular the inner-lying surface 12 of the diffusor 13, i.e. in the upper region of the hole 7, should be smooth in order to allow optimal outflow of a medium, in particular a coolant from the hole 7, because irregularities generate undesired turbulences or deviations. Much less stringent requirements are placed on the quality of the hole surface in the lower region 10 of the hole 7, since the arriving flow behavior is affected only little by this.

Figure 2:
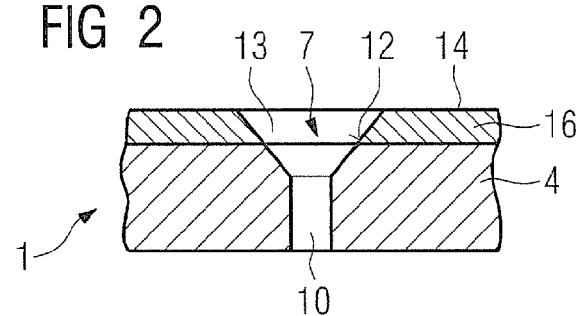
FIG. 2 shows a hole in a layer system.

FIG. 2 shows a component which is configured as a layer system.

On the substrate 4, there is at least one layer 16.

This may for example be a metal alloy of the MCrAlX type, where M stands for at least one element of the group ion, cobalt or nickel. X stands for yttrium and/or at least one rare earth element.

The layer 16 may also be ceramic.

There may also be a further layer (not shown) on the MCrAlX layer, for example a ceramic layer, in particular a thermal barrier layer.

The thermal barrier layer is for example a fully or partially stabilized zirconium oxide layer, in particular an EB-PVD layer or plasma-sprayed (APS, LPPS, VPS), HVOF or CGS (cold gas spraying) layer.

A hole 7 with the lower region 10 and the diffusor 13 is likewise formed in this layer system 1.

The comments above regarding production of the hole 7 apply to substrates 4 with and without a layer 16 or layers 16.

Figure 3:
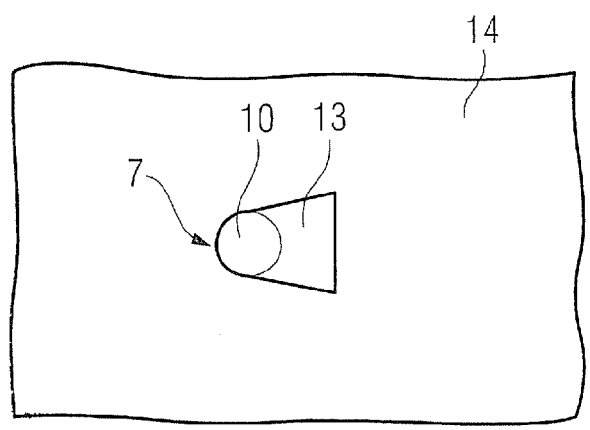
FIG. 3 shows a plan view of a through-hole to be produced.

FIG. 3 shows a plan view of a hole 7 according to FIG. 1 or 2.

The hole 7 may also extend at an acute angle to the surface 14 of the component 1.

Sequence of the Regions to be Produced for a Hole

Figure 4:
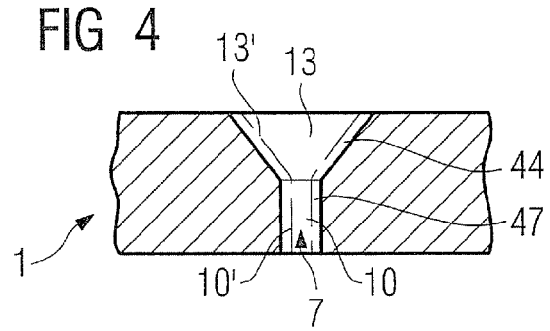

FIG. 4 shows the hole 7 with its desired final contour of the diffusor 13 and the lower region 10, dashes indicating the regions 10', 13' which correspond to the close to final contour shape.

Close to final contour in this context means that a particular layer thickness, for example a few μm thick, still exists as measured from a surface of the final contour of the lower region 10 and the diffusor 13. In any event the hole 7 is narrower with the close to final contour shape than with the final contour, the layer thickness being designed so that the method of processing with the close to final contour shape ensures that the hole 7 is not widened beyond its final contour. Close to final contour also means that further processing needs to be carried out.

FIG. 5 shows a chronological sequence according to the invention of the regions to be produced for the hole 7.

In a first working step a), a subregion 13' is produced with a close to final contour shape of the diffusor 13.

Longer pulse durations, in particular more than 500 ns, may be used for this. The laser 19' (FIG. 2) is preferably not displaced in the XY plane.

In a further method step b), the close to final contour shape 10' of the lower region is produced.

Longer pulse durations of more than 500 ns are preferably used for this, advantageously without the laser beam or the electron beam being displaced and with so-called laser percussion boring being used here. In this way, the majority of the hole 7 to be generated can be produced very rapidly.

In a further method step c), the final contour of the diffusor 13 is produced.

Shorter pulse times are preferably used for this, which are in particular less than 500 ns, in particular 300 ns. The laser 19, 19' is preferably displaced in the XY plane.

In the last working step d), the final contour of the lower region 10 is produced.

Laser percussion boring with longer pulse lengths, in particular >500 ns, may be used or shorter pulse lengths ≤500 ns are likewise used, in which case the laser beam or the electron beam is once more displaced in the XY plane.

Steps c) and d) may be interchanged (FIG. 6).

The close to final contour shape 13' of the diffusor 13 may also correspond to the geometry of the lower region 10' with its close to final contour shape, since the diffusor 13 always represents a widening of the cross section of the lower region.

If the lower region is a hole with a constant diameter, a hole with a somewhat smaller diameter will thus be produced for the close to final contour shape 10' of the lower region, this diameter then also representing the close to final contour shape 13' of the diffusor 13 (FIG. 7). Longer pulse lengths are used for this, in particular more than 500 ns, which corresponds to so-called laser percussion boring. For the further processing, there are two possibilities.

In a first further processing step, the final contour of the diffusor 13 is produced and then the final contour of the lower region 10, or in a second alternative the final contour of the lower region 10 is produced first and then the final contour 13 of the diffusor is produced (FIG. 7).

FIG. 8 shows other exemplary embodiments of the invention.

In a first step, the close to final contour shape 13' of the diffusor 13 is produced, in particular with longer pulse lengths.

In a further method step, the final contour of the diffusor 13 is produced (method step b). This is done by using shorter pulse lengths, the laser or electron beams in particular being displaced in the plane of the surface in which the diffusor is arranged.

In a first alternative, the lower region 10 is produced with its final contour using longer pulse lengths.

In a further alternative (c), d)), a final contour of the lower region 10 may initially be produced in method step c), this being done with longer pulse lengths.

In a last method step d), the final contour of the lower region 10 is then produced, this being done in particular with shorter pulse lengths.

Figure 9:
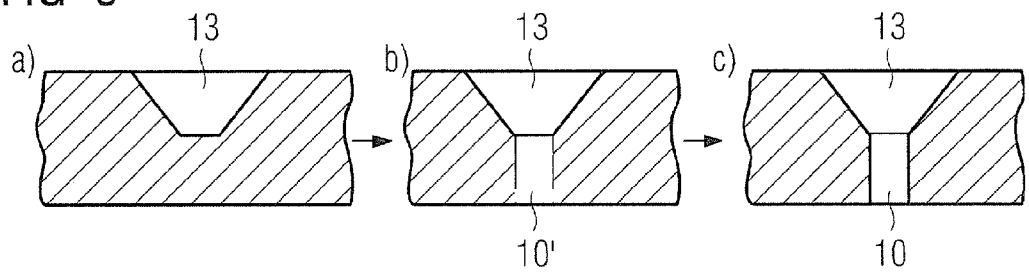

FIG. 9 shows another exemplary embodiment of the method according to the invention.

In a first step a), the final contour of the diffusor 13 is produced, the shorter pulse lengths in particular being used.

In a further method step b), the close to final contour shape 10' of the lower region 10 is produced. This is done with longer pulse lengths.

In a last method step c), the final contour of the lower region 10 is produced, this being done in particular with shorter wavelengths.

It is also possible to use only longer pulse lengths for producing the close to final contour region 10' and the final contour of the lower region', in which case the cross-sectional area which is ablated by the laser beam or electron beam in method step b) does not correspond to the diameter of the lower region. The beam of the lasers or the electrons is then widened in the method step so as to ablate a cross section which corresponds to the final contour of the lower region 10.

Thus, for producing a close to final contour shape of the diffusor or the lower region, longer pulse lengths are preferably used or the beam is adjusted so that it does not give the final contour.

Preferably, for producing the final contour, shorter pulse lengths are then used or the beam is adjusted as for longer pulse lengths so as to give the desired contour.

Laser Parameters

When using pulses with a particular pulse length, the output power of the laser 19', 19'' is for example constant.

For the longer pulse lengths, an output power of the laser 19', 19' in excess of 100 watts, in particular 500 watts, is used.

For the shorter pulse lengths, an output power of the laser 19', 19' less than 300 watts is used.

A laser 19', 19" with a wavelength of 532 nm is for example used only to generate shorter laser pulses.

For the longer pulse lengths, in particular a laser pulse duration of 0.4 ms and an energy (joules) of the laser pulse from 6 J to 10 J, in particular 8 J, is used, a power (kilowatts) of from 10 kW to 50 kW, in particular 20 kW, being preferred.

The shorter laser pulses have an energy in the single-figure or two-figure millijoule (mJ) range, preferably in the single-figure millijoule range, the power used usually lying particularly in the single-figure kilowatt range.

Number of Lasers

The method may employ one laser, or two or more lasers 19', 19" (FIG. 10) which are used simultaneously or successively. The similar or different lasers 19', 19" have for example different ranges in respect of their laser pulse lengths. For example a first laser 19' may generate laser pulse lengths of less than or equal to 500 ns, in particular less than 100 ns, and a second laser 19" may generate laser pulse lengths of more than 100 ns, in particular more than 500 ns.

In order to produce a hole 7, the first laser 19' is used first. The second laser 19" is then used for the further processing, or vice versa.

For producing the through-hole 7, it is also possible to use only one laser. In particular, a laser is used which for example has a wavelength of 1064 nm and can generate both the longer laser pulses and the shorter laser pulses.

Device

Figure 10:
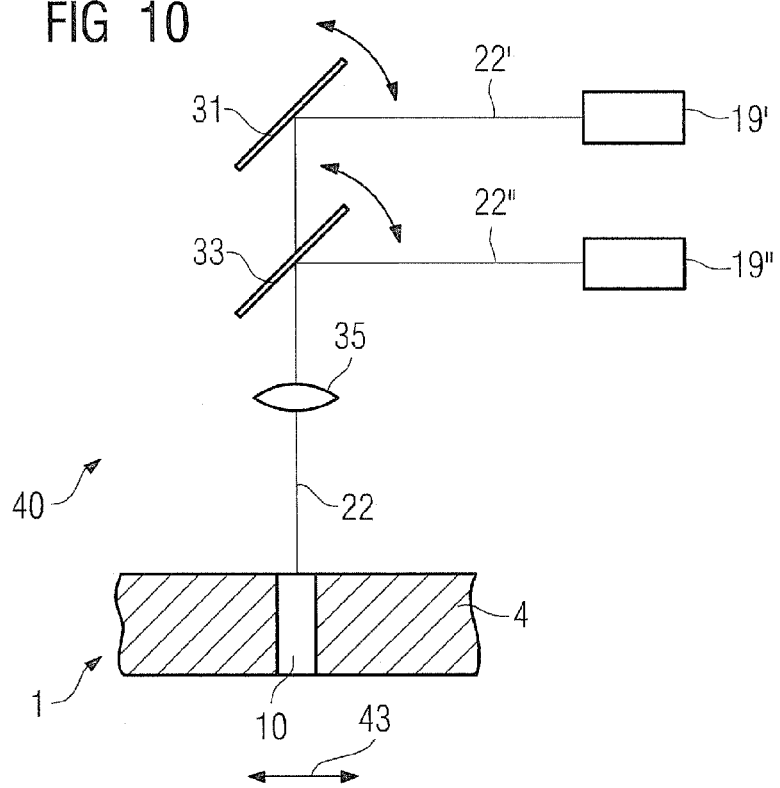
FIG. 10 shows an apparatus for carrying out the method.

FIG. 10 shows an exemplary devices 40.

The devices 40 consist of at least one optical component 35, 35', in particular at least one lens 35, which directs at least one laser beam 22, 22', 22" onto the substrate 4 in order to produce the hole 7.

There are one, two lasers 19', 19". The laser beams 22, 22', 22" may be guided to the optics 35 via minors 31, 33.

The mirrors 31, 33 can be moved or rotated so that, for example, only one laser 19', 19" can respectively send its laser beams 22' or 22" via the minor 31 or 32 and the lens 35 onto the component 1.

The component 1, 120, 130, 155 or the optics 35 or the mirrors 31, 32 can be displaced in a direction 43 so that the laser beam 22, 22' is displaced over the component 1, for example according to FIG. 5.

The lasers 19', 19" may for example have a wavelengths of either 1064 nm or 532 nm. The lasers 19', 19" may have different wavelengths: 1064 nm and 532 nm.

In respect of pulse length, the laser 19' is for example adjustable to pulse lengths of 0.1-5 ms; conversely, the laser 19' to pulse lengths of 50-500 ns.

By moving the mirrors 31, 33, the beam of the laser 19', 19" having those laser pulse lengths which are required, for example to produce the outer edge region 28 or the inner region 25, can respectively be delivered via the optics 35 onto the component 1.

FIG. 10 shows two lasers 19', 19", two mirrors 31, 33 and one optical component in the form of the lens 35.

If for example the outer edge region 28 is initially produced according to FIG. 6, then the first laser 19' with the shorter laser pulse lengths will be connected up.

If the inner region 25 is then produced, then the first laser 19' will be disconnected by moving the mirror 31 and the second laser 19" with its longer laser pulse lengths will be connected up by moving the mirror 33.

Components

Figure 11:
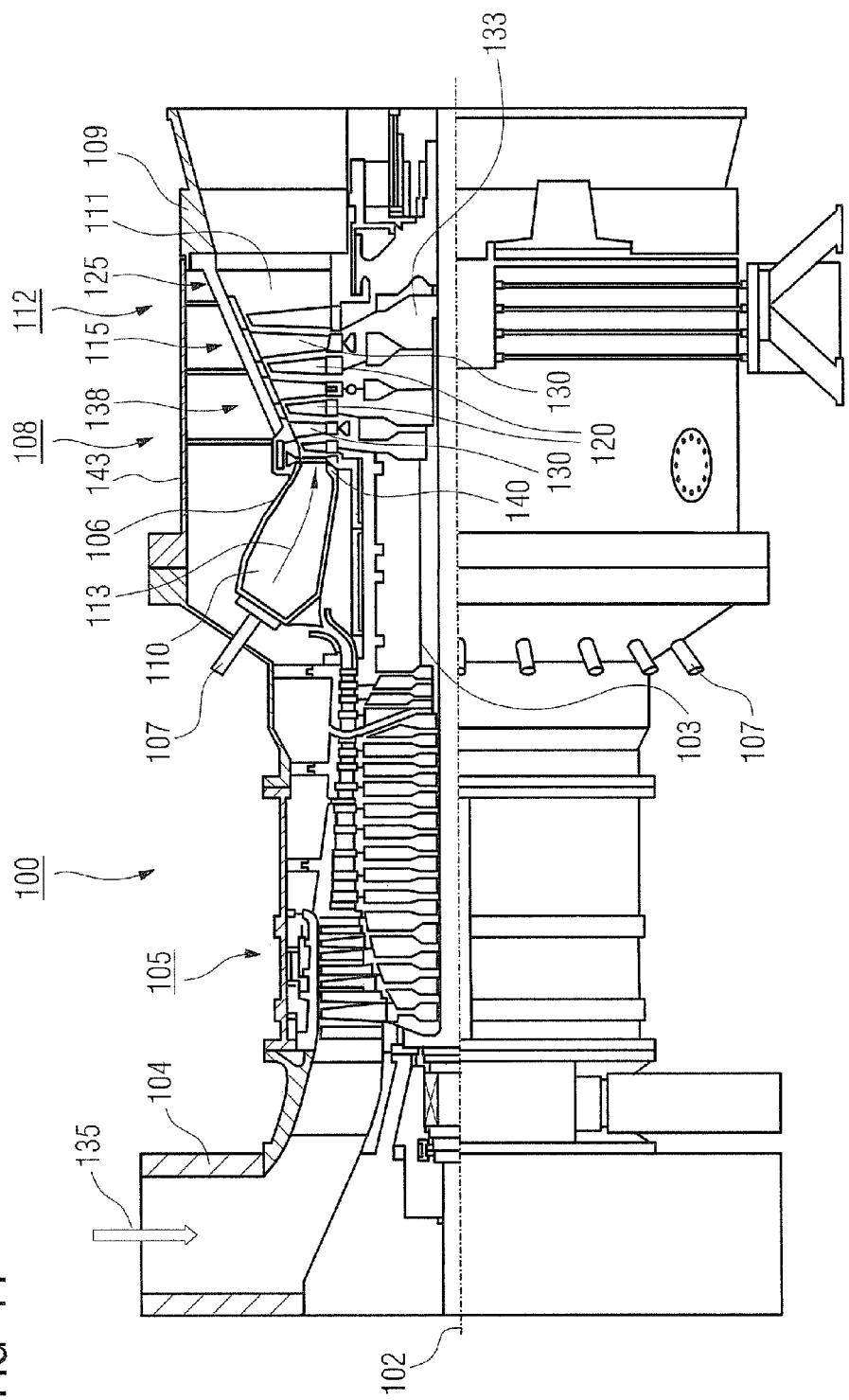
FIG. 11 shows a gas turbine.

FIG. 11 shows a gas turbine 100 by way of example in a partial longitudinal section.

The gas turbine 100 internally comprises a rotor 103, which will also be referred to as the turbine rotor, mounted so as to rotate about a rotation axis 102 and having a shaft 101.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the end of the compressor 105 on the turbine side is delivered to the burners 107 and mixed there with a fuel. The mixture is then burnt to form the working medium 113 in the combustion chamber 110.

From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS structure).

Iron-, nickel- or cobalt-based superalloys used as material for the components, in particular for the turbine blades 120, 130 and components of the combustion chamber 110.

Such superalloys are known for example from EP 1 204 776 B1, EP 1 306 454, EP 1 319 729 A1, WO 99/67435 or WO 00/44949 are used; with respect to the chemical composition of the alloys, these documents are part of the disclosure.

The guide vane 130 comprises a guide vane root (not shown here) facing the inner housing 138 of the turbine 108, and a guide vane head lying opposite the guide vane root. The guide vane head faces the rotor 103 and is fixed on a fastening ring 140 of the stator 143.

FIG. 12 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406.

As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a fir tree or dovetail root are possible.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130.

Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation.

Such monocrystalline workpieces are manufactured, for example, by directional solidification from the melts. These are casting methods in which the liquid metal alloy is solidified to form a monocrystalline structure, i.e. to fowl the monocrystalline workpiece, or is directionally solidified.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; with respect to the solidification method, these documents are part of the disclosure.

The blades 120, 130 may likewise have coatings against corrosion or oxidation, for example (MCrAlX; M is at least one element from the group ion (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

The density may preferably be 95% of the theoretical density.

A protective aluminum oxide layer (TGO=thermal grown oxide layer) is formed on the MCrAlX layer (as an interlayer or as the outermost layer).

On the MCrAlX, there may furthermore be a thermal barrier layer, which is preferably the outermost layer and consists for example of $ZrO_2$, $Y_2O_3$—$ZrO_2$, i.e. it is not stabilized or is partially or fully stabilized by yttrium oxide and/or calcium oxide and/or magnesium oxide.

The thermal barrier layer covers the entire MCrAlX layer.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CDV. The thermal barrier layer may comprise produces porous, micro- or macro-cracked grains for better by shock resistance. The thermal barrier layer is thus preferably more porous than the MCrAlX layer.

The blade 120, 130 may be designed to be hollow or solid.

If the blade 120, 130 is intended to be cooled, it will be hollow and optionally also comprise film cooling holes 418 (indicated by dashes) which are produced by the method according to the invention.

FIG. 13 shows a combustion chamber 110 of a gas turbine 100.

The combustion chamber 110 is designed for example as a so-called ring combustion chamber in which a multiplicity of burners 107, which produce flames 156 and are arranged in the circumferential direction around a rotation axis 102, open into a common combustion chamber space 154. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Owing to the high temperatures inside the combustion chamber 110, a cooling system may also be provided for the heat shield elements 155 or for their retaining elements. The heat shield elements 155 are then hollow, for example, and optionally also have film cooling holes (not shown) opening into the combustion chamber space 154, which are produced by the method according to the invention.

Each heat shield element 155 made of an alloy is equipped with a particularly heat-resistant protective layer (MCrAlX layer and/or ceramic coating) on the working medium side, or is made of refractory material (solid ceramic blocks).

These protective layers may be similar to the turbine blades, i.e. for example MCrAlX means: M is at least one element from the group ion (Fe), cobalt (Co), nickel (Ni), X is an active element and stands for yttrium (Y) and/or silicon and/or at least one rare earth element, or hafnium (Hf). Such alloys are known from EP 0 486 489 B1, EP 0 786 017 B1, EP 0 412 397 B1 or EP 1 306 454 A1 which, with respect to the chemical composition of the alloy, are intended to be part of this disclosure.

On the MCrAlX, there may furthermore be an e.g. ceramic thermal barrier layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

Other coating methods may be envisaged, for example atmospheric plasma spraying (APS), LPPS, VPS or CDV. The thermal barrier layer may comprise porous, micro- or macro-cracked grains for better by shock resistance.

Refurbishment means that turbine blades 120, 130 and heat shield elements 155 may need to have protective layers taken off (for example by sandblasting) after their use. The corrosion and/or oxidation layers or products are then removed. Optionally, cracks in the turbine blade 120, 130 or the heat shield element 155 are also repaired. The turbine blades 120, 130 or heat shield elements 155 are then recoated and the turbine blades 120, 130 or the heat shield elements 155 are used again.

We claim:

1. A method for producing a hole in a layer system, comprising:
    producing a hole outer diffuser initial contour that approximately represents a final outer diffuser contour, while leaving a diffuser buffer layer of material between the initial outer diffuser contour and the final outer diffuser contour using a first pulse length;
    producing a final contour on the hole outer diffuser by removing the diffuser buffer layer, wherein the final contour on the hole outer diffuser is produced using a pulsed electron beam or a pulsed laser beam comprising a second pulse length that is different than the first pulse length;
    producing a final hole lower region concentric with the outer diffuser using the first pulse length,
    wherein the hole outer diffuser initial contour, the hole outer diffuser final contour and the final hole lower region is produced using a pulsed electron beam or a pulsed laser beam.

2. The method as claimed in claim 1, wherein the diffuser is produced first with the final contour and then the lower region is produced with the final contour.

3. The method as claimed in claim 1, wherein the first pulse length is >500 ns.

4. The method as claimed in claim 1, wherein the first pulse length is ≤500 ns and produces the approximate contour shape of the hole diffuser and hole lower region.

5. The method as claimed in claim 1, wherein the second pulse length is >500 ns and produces the final contour shape of the hole diffuser and hole lower region.

6. The method as claimed in claim 1, wherein the second pulse length is ≤500 ns.

7. The method as claimed in claim 1, wherein the lower region is symmetrical.

8. The method as claimed in claim 1, wherein the outer diffuser is asymmetrical.

9. The method as claimed in claim 1, wherein the laser or electron beam is displaced in an xy plane.

10. The method as claimed in claim 1, wherein the laser or electron beam is not displaced when using longer pulses.

11. The method as claimed in claim 1, wherein the hole is produced in a component of a gas turbine.

12. The method as claimed in claim 1, wherein the diffuser buffer layer is a few μm thick.

13. A method for producing a hole in a layer system, comprising:
    producing a final contour on the hole outer diffuser using a pulsed electron beam or a pulsed laser beam comprising a first pulse length;
    producing a hole lower region concentric with the outer diffuser that approximately represents a final hole lower region contour, while leaving a lower region buffer layer of material between the initial lower region contour and the final lower region contour, wherein the hole lower region that approximately represents a final hole lower region contour is produced using a pulsed electron beam or a pulsed laser beam comprising a second pulse length; and
    producing a final contour on the hole lower region by removing the lower region buffer layer, wherein the final contour on the hole lower region is produced using a pulsed electron beam or a pulsed laser beam comprising the first pulse length, and
    wherein the first pulse length and the second pulse length are different.

14. The method as claimed in claim 13, wherein the diffuser is produced first with the final contour and then the lower region is produced.

15. The method as claimed in claim 13, wherein the second pulse length is >500 ns.

16. The method as claimed in claim 13, wherein the first pulse length is ≤500 ns.

17. The method as claimed in claim 13, wherein the lower region is symmetrical.

18. The method as claimed in claim 13, wherein the outer diffuser is asymmetrical.

19. The method as claimed in claim 13, wherein the laser or electron beam is displaced in an xy plane.

20. The method as claimed in claim 13, wherein the laser or electron beam is not displaced when using longer pulses.

* * * * *